(12) United States Patent
André

(10) Patent No.: US 6,356,926 B1
(45) Date of Patent: Mar. 12, 2002

(54) DEVICE AND METHOD FOR CALCULATING FFT

(75) Inventor: Tore André, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/284,752

(22) PCT Filed: Sep. 29, 1997

(86) PCT No.: PCT/SE97/01637

§ 371 Date: Jun. 17, 1999

§ 102(e) Date: Jun. 17, 1999

(87) PCT Pub. No.: WO98/18083

PCT Pub. Date: Apr. 30, 1998

(30) Foreign Application Priority Data

Oct. 21, 1996  (SE) .............................................. 9603862

(51) Int. Cl.[7] .............................................. G06F 17/14
(52) U.S. Cl. ....................................................... 708/404
(58) Field of Search ................................ 708/404, 405

(56) References Cited

U.S. PATENT DOCUMENTS

| | | | | |
|---|---|---|---|---|
| 3,617,720 A | * | 11/1971 | Gentleman .................. | 708/404 |
| 3,673,399 A | * | 6/1972 | Hancke et al. .............. | 708/404 |
| 3,704,826 A | * | 12/1972 | Constaintin .................. | 708/404 |
| 4,899,301 A | * | 2/1990 | Nishitani et al. ........... | 708/404 |
| 5,430,667 A | * | 7/1995 | Takano ........................ | 708/404 |
| 5,751,616 A | * | 5/1998 | Hegland et al. ............. | 708/404 |

\* cited by examiner

*Primary Examiner*—David H. Malzahn
(74) *Attorney, Agent, or Firm*—Burns, Doane, Swecker & Mathis, L.L.P.

(57) ABSTRACT

The present invention relates to a device and a method for calculating FFT, IFFT or like transforms with the aid of a calculating unit and at least two memories. The calculating unit reads input values from the memory positions in the memories, performs a group of calculations in at least one calculation step, and writes the output values obtained with these calculations into memory positions in the memories. The invention comprises the steps of reading-in and immediately storing the input values for calculation in different groups of calculations. When all input values necessary for a current group of calculations have been read in and the calculations in a preceding group of calculations have terminated at least one first calculation step, calculations in the current group of calculations are commenced. The output values from the current group of calculations are stored intermediately until the output values from the preceding group of calculations have been written, and are then written back into the same memory positions as those from which the input values were read, whereafter the output values can function as new input values. This enables at least two groups of calculations to be commenced at one and the same time.

14 Claims, 9 Drawing Sheets

DEVICE AND METHOD FOR CALCULATING FFT

FIELD OF INVENTION

The present invention relates to a method of calculating Fast Fourier Transform (FFT) and to a device for carrying out the method, and in particular to the interconnection of and the coaction between the calculating unit and the memory of said device.

BACKGROUND OF THE INVENTION

The Discrete Fourier Transform (DFT) of a sequence f(n) is defined as:

$$X(k) = \sum_{n=0}^{N-1} x(n) W^{kn} (n = 0, 1, \ldots, N-1)$$

where the weight coefficient $W = e^{-12\pi/N}$.

The inverse to the Discrete Fourier Transform is defined as $$x(n) = \frac{1}{N} \sum_{k=0}^{N-1} X(k) W^{kn} (k = 0, 1, \ldots, N-1)$$

where the weight coefficient $W = e^{-12\pi/N}$.

If X(k) or x(n) is calculated directly in accordance with the definitions, the number of additions will be N(N−1) and the number of multiplications will be generally in the order of magnitude of $N^2$.

In 1965, Cooley and Tukey introduced a novel method of calculating X(k) and x(n) respectively, resulting in a much shorter calculation time. The method was designated Fast Fourier Transform (FFT) and utilizes the circumstance that the same calculations reoccur at several positions. The number of additions and multiplications can be reduced to the order of $\log_2 N$ when N is a two-power.

In brief, the method is based on a number of successive calculations with a series or column of values, where each pair of calculations is called a butterfly.

This gives a new column of N number of values. These are used for new, similar calculations and give, in turn, a new column of N number of values and so on, until $\log_2 N$ columns have been calculated, the answer being given by the last series. This method can be varied in a number of different ways.

The old series is no longer required each time a new series is calculated. This enables the memory, or store, in which the previous series is stored to be reused, this being referred to as calculating inplace. Thus, the method can be carried out with a memory of size N, disclosed in GB 1 546 173 and GB 2 006 485, for instance. The drawback with this is that memory accesses are always made to the same memory, which is not particularly effective.

FFT can also be implemented with the use of two memories of size N, as disclosed in the technical report "An Energy-Efficient FFT Processor Architecture" (NGT-70340-1994-1), Department of Electrical Engineering, Stanford University, Stanford, Calif., U.S.A. Data is read from one memory, processed and then written into the other memory. This method is faster than calculating inplace, since writing and reading can take place simultaneously. The drawback with this method is that it requires twice as much memory as the FFT to be calculated.

SUMMARY OF THE INVENTION

The present invention addresses the problem of FFT calculations requiring either a great deal of time or a large amount of memory space.

The object of the present invention is to provide a solution to this problem by organizing the interconnection and coaction between the calculating unit and memory, so as to enable two butterfly calculations to be commenced simultaneously. This is achieved by reading the input values from memory positions in the memories and intermediately storing these input values in a register in the calculating unit after reading, and/or by storing the output values to be written into memory positions in the memory intermediately in a register in the calculating unit prior to writing-in said values. The values are conveniently allocated or distributed so that each memory will contain essentially the same number of values. This enables, for instance, two memories to be used to a maximum, by reading from and writing into memory positions in the two memories simultaneously. Alternatively, values can be read from one memory at the same time as values are written into the other memory.

One advantage afforded by the present invention is that the memories are utilized to a maximum, therewith enabling the memory space to be minimized to half the memory space required by the known solution that utilizes two memories. Another advantage is that the time required in this respect can be reduced in comparison with the time required by the known solution that utilizes a single memory.

The invention will now be described in more detail with reference to preferred embodiments thereof and also with reference to the accompanying drawings. In the following text, a butterfly designates a group of least two calculations, where each calculation includes at least one calculation step.

BRIEF DESCRIPTION OF THE DRAWINGS

FIG. 1b is a graphic illustration of the butterfly calculation in FIG. 1a.

FIG. 2b is a graphic illustration of the butterfly calculation in FIG. 2a.

FIG. 3b is a graphic illustration of the butterfly calculation in FIG. 3a.

FIG. 8b is a block schematic illustrating one embodiment of the summation unit in FIG. 8a.

DESCRIPTION OF PREFERRED EMBODIMENTS

Fast Fourier Transform (FFT) is a method of rapidly calculating the Discrete Fourier Transform (DFT). It can be used, inter alia, when wishing to see how the frequency domains look after having sampled the values in the time domain. Typical areas of use include spectral analysis, distortion analysis, vibration signature analysis, frequency response estimation, convolution, correlation and power spectra.

The invention is primarily intended for use in a communications system that employs multi-carrier wave modulation and where inverse FFT (IFFT) is used for modulation whereas FFT is used for demodulation, although the invention may, of course, be used in other areas.

Multi-carrier wave modulation is a known method of transmitting a large number of Mbits over a telephone line, for instance. In brief, the method is based on sampling speech in a telephone conversation, resulting in a large number of bits. The bits to be transmitted are delivered to a transmitter in some complex number form, whereafter an IFFT is carried out. In the modulation process, the IFFT gives a sum of orthogonal carrier waves or tones whose amplitudes and phase shifts are influenced by the complex numbers. In a receiver, FFT is carried out instead, wherewith the original bits are returned. Attenuation in the telephone line can be readily compensated for, by multiplying by a complex number on each carrier wave. Multi-carrier wave modulation is described in more detail in WO 95/03656, EP 0 653 858, EP 0 656 706, EP 0 683 676 and WO 95/05042, for instance.

Figure 1A:
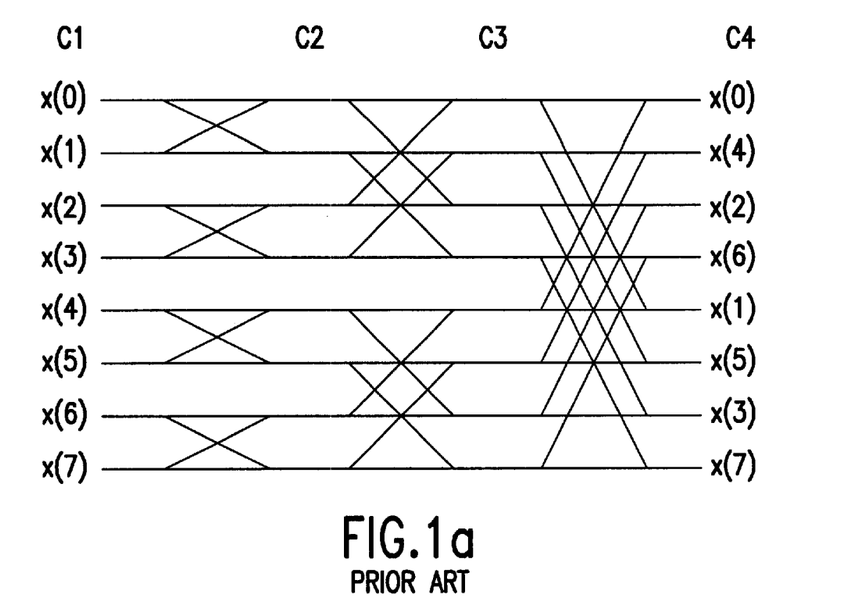
FIG. 1a is a graphic illustration of a known eight-point radix-2 decimation-in-time FFT algorithm.
Figure 1B:
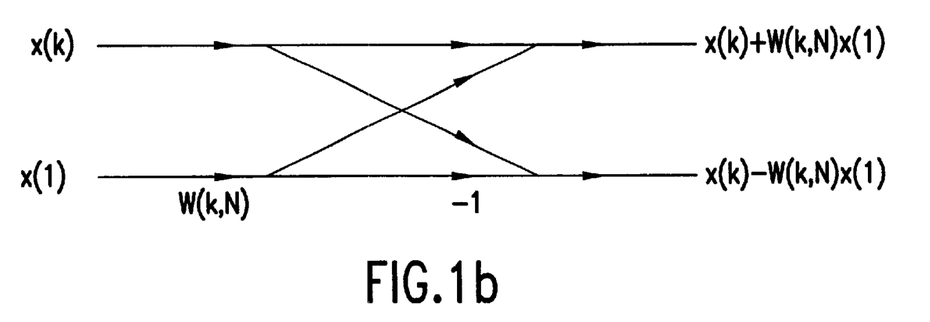

FIG. 1a is a graphic presentation of a known FFT algorithm having eight input values x(0)–x(7) and eight output values X(0)–X(7). FIG. 1b illustrates a recurring group of calculations referred to as a butterfly for obvious reasons. Because a butterfly has two input values and two output values in this case, this FFT as algorithm is called a radix-2 type algorithm. Each butterfly includes a complex multiplication and two complex additions according to:

$$x'(k)=x(k)+W(k,N)\times(l)$$

$$x'(l)=x(l)-W(k,N)\times(l)$$

where k and l vary in accordance with FIG. 1a. W(k,N) is called the weight coefficient or phase factor. This butterfly variant is referred to as decimation-in-time (DIT).

The input values x(0)–x(7) in column C1 are used to calculate a new series of values in column C2, which is used, in turn, to calculate column C3, which, in turn, is used to calculate column C4. Column C4 will then include the desired output values X(0)–X(7). The input values x(0)–x(7) in FIG. 1a are in the correct order, wherewith the output values X(0)–X(7) becomes mixed. The opposite is also conceivable.

Figure 2A:
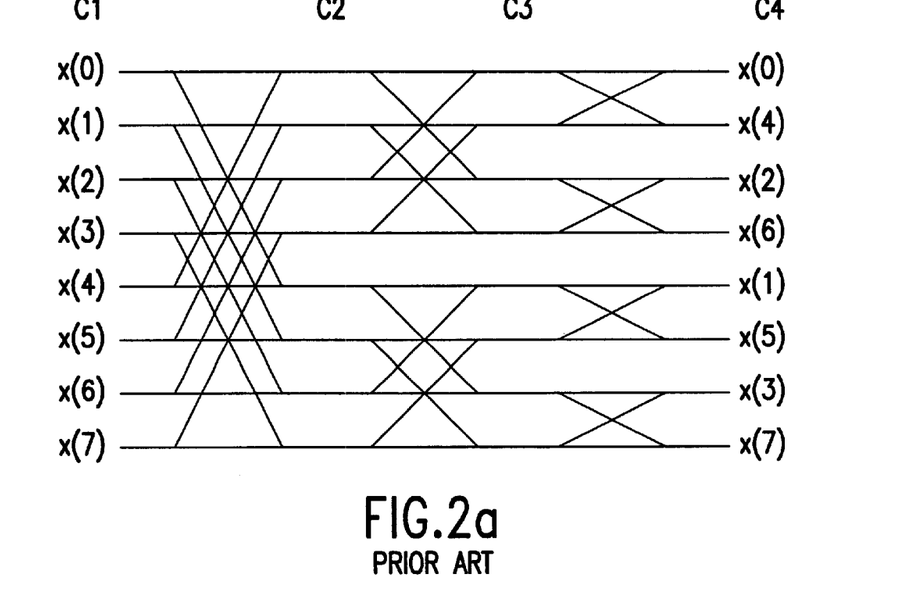
FIG. 2a is a graphic illustration of a known eight-point radix-2 decimation-in-frequency FFT algorithm.
Figure 2B:
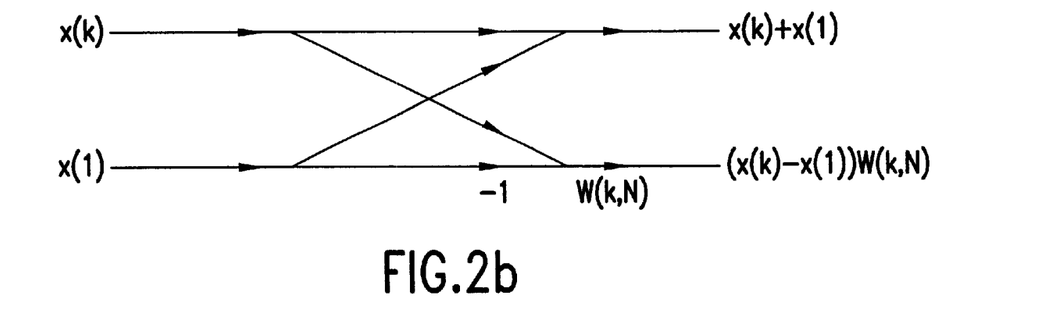

FIG. 2a illustrates a graphic presentation of another known radix-2-FFT algorithm. This algorithm is called a decimation-in-frequency (DIF) algorithm. FIG. 2b shows a corresponding butterfly according to:

$$x'(k)=x(k)+x(l)$$

$$x'(l)=(x(k)-x(l))W(k,N)$$

FIGS. 1a and 2a show algorithms with N=8 points. Radix-2 functions for all calculations with N-samples, where N=$2^v$ and v is a positive integer.

Figure 3A:
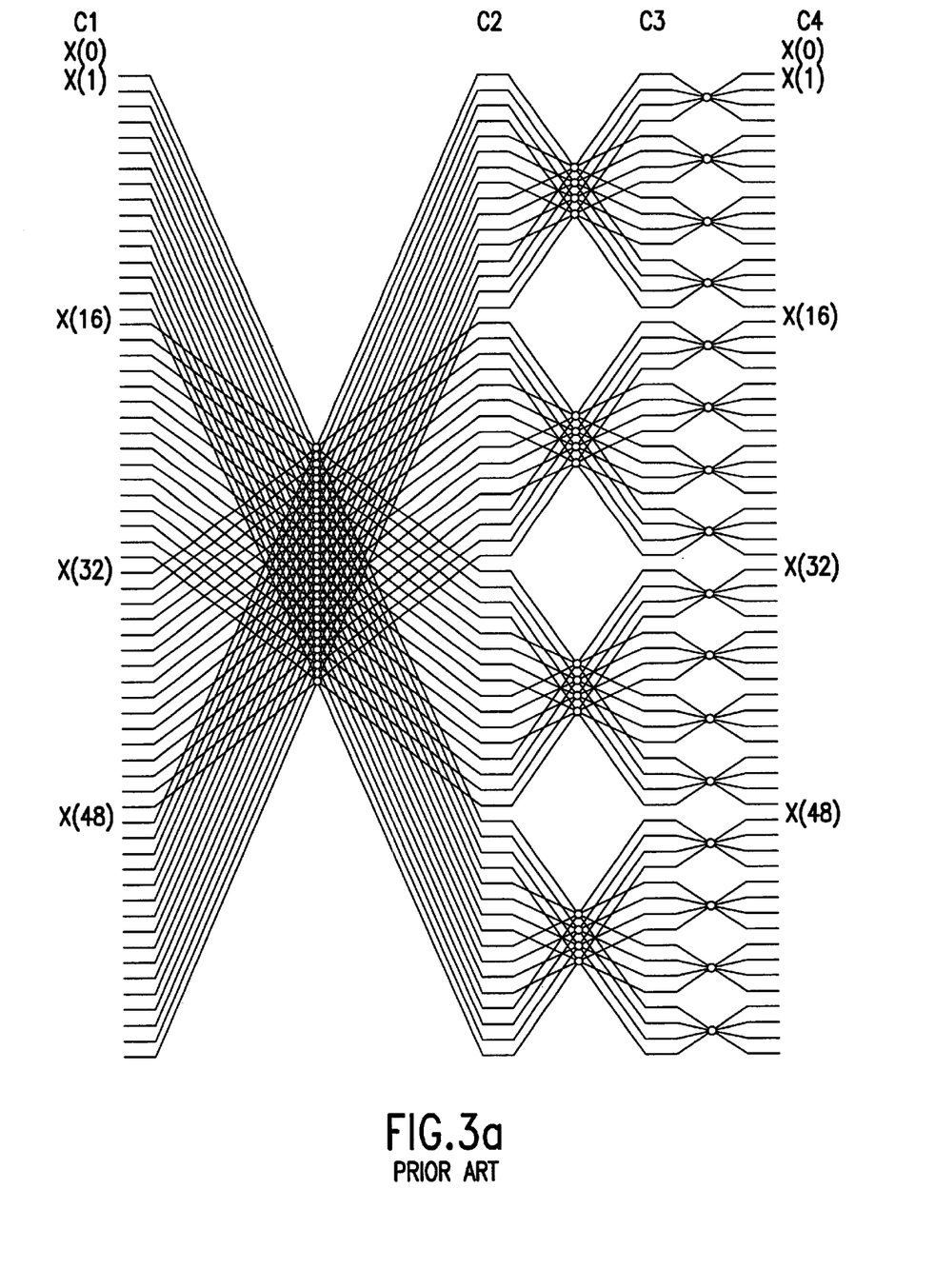
FIG. 3a is a graphic illustration of a known 64-point radix-4 decimation-in-frequency FFT algorithm.

FIG. 3a shows a known example of a decimation-in-frequency radix-4-FFT algorithm having 64 input values and 64 output values. In this case, four input values and four output values are used for the butterfly. Radix-4 functions for all calculations with N-samples, where N=$4^v$ and v is a positive integer. The butterfly of the algorithm is shown schematically in FIG. 3a, and in more detail in FIG. 3b.

Figure 3B:
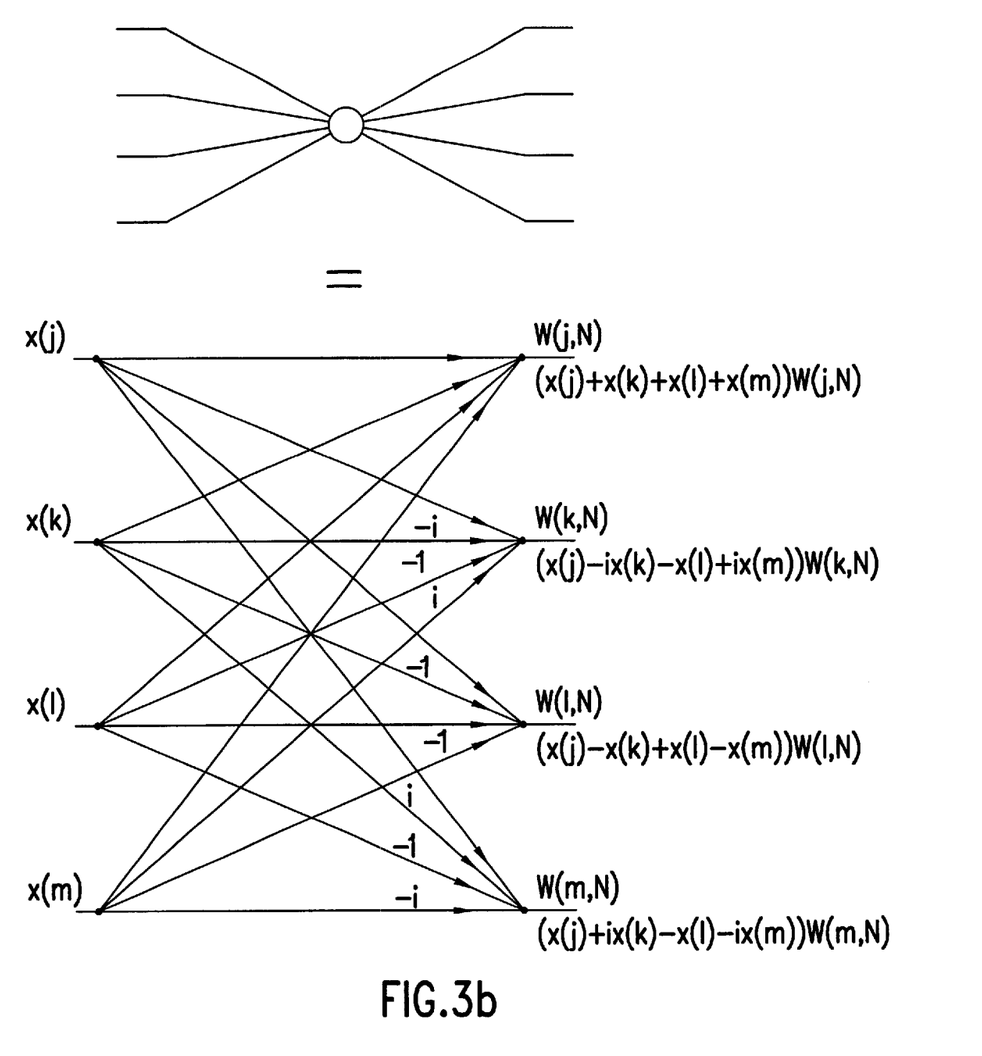

The calculations in FIG. 3b are as follows:

$$x(j)'=(x(j)+x(k)+x(l)+x(m))W(j,N)$$

(where W(j,N)=1)

$$x(k)'=(x(j)-ix(k)-x(l)+ix(m))W(k,N)$$

$$x(l)'=(x(j)-x(k)+x(l)-x(m))W(l,N)$$

$$x(m)'=(x(j)+ix(k)-x(l)-ix(m))W(m,N)$$

where j, k, l, m vary in accordance with FIG. 3a and i=$\sqrt{-1}$. Compare also Tables 5 and 6 below.

Naturally, there is also a decimation-in-time radix-4 FFT algorithm; c.f. Table 4 below. FFT algorithms having higher radix numbers are also known, although radix-2 and radix-4 are the most common.

A common feature of all FFT algorithms is that the FFT is divided into a number of columns in which subtotals are calculated. These subtotals are then used as input values for the next column. The number of columns is decided by the size of the FFT to be calculated and also by the radix used. An FFT processor can thus be built-up around a calculating or computing unit that performs a butterfly calculation, and at least one data store.

Because the values from one column are used solely to calculate the next column, it is possible, and known, to use a memory or store of the same size N as that of the FFT to be calculated, and to write the calculated values from one column into those memory positions that were previously occupied by the input values. One drawback is that it is not generally possible to read and write from one memory at one and the same time, meaning that the calculation will take a long time to perform unless a fast memory is available. A fast memory, however, draws more current.

Because it is possible to perform complex multiplications in the calculating unit with each clock cycle, the bottleneck lies in the memory accesses. At least two memory accesses per clock cycle would be desirable as an optimum.

Figure 4A:
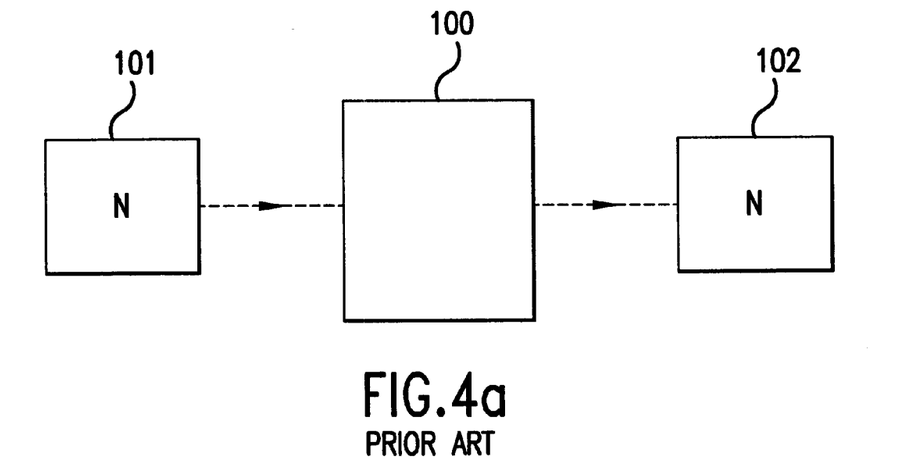
FIGS. 4a and 4b is a graphic illustration of known technology.
Figure 4B:
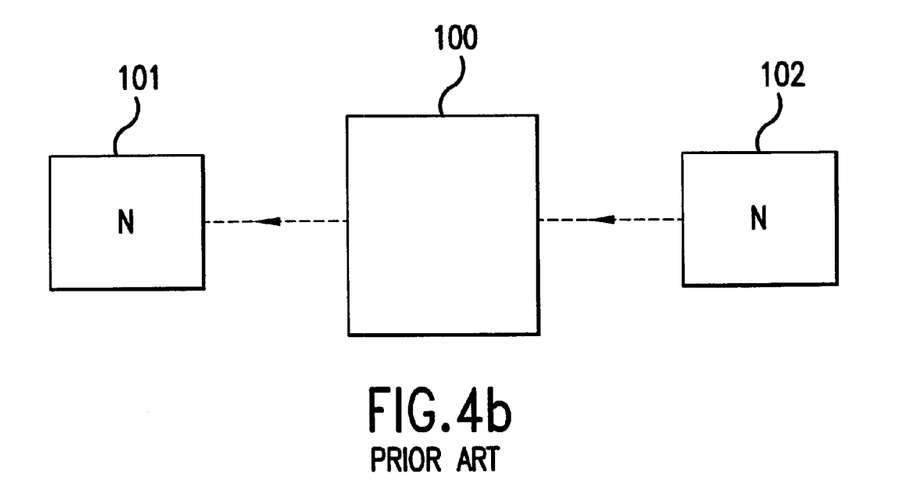

FIGS. 4a and 4b illustrate an alternative method of organizing the memory and the calculating unit. FIGS. 4a and 4b illustrate solely the principle of transmitting data to and fro and shall not be interpreted literally. One calculating unit 100 and first and second memories 101 and 102 are used. The input values are first read from memory positions in a first memory 101 of said two memories, at the same time as the output values are written into memory positions in the other or second memory 102; see FIG. 4a. The results of the calculation of a first column lie in the second memory 102.

Data in the second memory 102 is then used as the input values to the calculating unit 100, while the output values for the next column are written into memory positions in the first memory 101. The memories 101 and 102 are thus switched until the whole of the FFT has been calculated. Each of the memories 101 and 102 must have at least the same size as the FFT to be calculated.

However, it would be possible to use a memory area of half this size, e.g. by storing half of the values of one column in one memory and the other half of said values in another memory. It is difficult, however, to find a division that would enable both memories to be used to the same extent, i.e. to avoid overloading one memory.

If, for instance, the first half of said values are stored in one memory and the other half of said values in another memory, at least one of the columns will incorporate the problem that all input values lie in said one memory and all output values shall be written into the same memory, whereas the other memory is not used at all. The same problem arises when, for instance, placing odd memory positions in one memory and even positions in the other memory, although in another column.

The invention is based on calculating butterflies from different parts of the column in the calculating unit at one and the same time. This enables values to be read from and written into the two memories alternately, in a manner to ensure that no memory will be overloaded. The memory requirement can be halved in comparison with the afore-described method, at the cost of a few more registers in the calculating unit for the intermediate storage of subresults.

Table 1 below illustrates an example of the configuration of a calculating process. A radix-2 DIT with N=8 is calculated in the same way as in FIG. 1a. In order to simplify the Table, for instance, 0=0'=0"=0''' signify, the memory position 0 in a memory, at the same time as it can also be interpreted as the values x(0), x'(0), x"(0) and x'''(0) that are stored in memory position 0. The memories are referenced 111 and 112, which is in accord with FIGS. 5 and 6 described here below. Each row in the Table corresponds to a clock cycle. It will be noted that a calculation often includes more than one calculating step and that the Table thus gives only a simplified picture.

The two memories are divided so that the first memory 112 will contain values that have odd numbers, while the second memory 111 will include values that have even numbers. Other divisions are possible. For instance, the values x(0), x(1), x(2) and x(3) can be inputted in one memory and the values x(4), x(5), x(6) and x(7) inputted in the other memory.

Calculation of the first column is simple, by virtue of the two input values required for each butterfly lying in a respective memory. The calculating unit reads value x(0) from one memory position in the first memory 112 and value x(1) from a memory position in the second memory 111. The butterfly is calculated in the two subsequent clock cycles and results in the output values x'(0) and x'(1) that are to be written back into the memory positions 0 and 1 as the values x(0) and x(1) were read from. This cannot be done immediately, however, and it is necessary to store the output values x'(0) and x'(1) intermediately in registers until the values can be written-in two clock cycles later on.

As the first butterfly is being calculated, a new pair of input values x(2) and x(3) is read, whereafter the new output values x'(2) and x'(3) are calculated and written-in in accordance with the same procedure, which is also repeated for the following values x(4), x(5), and x(6), x(7).

All is well up to this point, but when the next column is to be calculated we discover that the two values required for each butterfly calculation will constantly be found in memory positions in one and the same memory and to crown it all shall be written into memory positions in the same memory.

This problem is solved by reading the input values of two butterflies simultaneously. The first butterfly requires the values x'(0) and x'(2), whereas the second butterfly requires the values x'(1) and x'(3). Consequently, the values x'(0) and x'(1) are read on the first instance and stored intermediately. The values x'(2) and x'(3) are then read. The first butterfly calculation with x'(0) and x'(2) can now be carried out, which takes two clock cycles, whereafter the second butterfly calculation can be carried out with x'(1) and x'(3). New values are read during this time period, in accordance with the aforegoing.

The third column is calculated in the same way.

TABLE 1

| Read 111 | Write 111 | Read 112 | Write 112 | Calculation | Finished |
|---|---|---|---|---|---|
| 0 | | 1 | | | |
| 2 | | 3 | | | |
| | | | | 0–1 | |
| 4 | | 5 | | 0–1 | 0' |
| | | | | 2–3 | 1' |
| 6 | | 7 | | 2–3 | 2' |
| | 0' | | 1' | 4–5 | 3' |
| 0' | | 1' | | 4–5 | 4' |
| | 2' | | 3' | 6–7 | 5' |
| 2' | | 3' | | 6–7 | 6' |
| | 4' | | 5' | 0'–2' | 7' |
| 4' | | 5' | | 0'–2' | 0" |
| | 6' | | 7' | 1'–3' | 2" |
| 6' | | 7' | | 1'–3' | 1" |
| | 0" | | 1" | 4'–6' | 3" |
| | | | | 4'–6' | 4" |
| | 2" | | 3" | 5'–7' | 6" |
| 0" | | 1" | | 5'–7' | 5" |
| | 4" | | 5" | | 7" |
| 4" | | 5" | | | |
| | 6" | | 7" | 0"–4" | |
| 2" | | 3" | | 0"–4" | 0''' |
| | | | | 1"–5" | 4''' |
| 6" | | 7" | | 1"–5" | 1''' |
| | 0''' | | 1''' | 2"–6" | 5''' |
| | | | | 2"–6" | 2''' |
| | 4''' | | 6''' | 3"–7" | 6''' |
| | | | | 3"–7" | 3''' |
| | 2''' | | 3''' | | 7''' |
| | 6''' | | 7''' | | |

It will be noted that when making an FFT calculation in this way with solely eight values, a delay must be included between the second and third columns. This problem disappears when larger numbers of values are used, as evident from Table 2 below. It should be noted that the reference signs ', " and ''' will not be included in the Tables any more.

TABLE 2

| Read 111 | Write 111 | Read 112 | Write 112 | Calculation | Finished |
|---|---|---|---|---|---|
| 0 | | 1 | | | |
| 2 | | 3 | | | |
| | | | | 0–1 | |
| 4 | | 5 | | 0–1 | 0 |
| | | | | 2–3 | 1 |
| 6 | | 7 | | 2–3 | 2 |
| | 0 | | 1 | 4–5 | 3 |
| 8 | | 9 | | 4–5 | 4 |
| | 2 | | 3 | 6–7 | 5 |
| 10 | | 11 | | 6–7 | 6 |
| | 4 | | 5 | 8–9 | 7 |
| 12 | | 13 | | 8–9 | 8 |
| | 6 | | 7 | 10–11 | 9 |
| 14 | | 15 | | 10–11 | 10 |
| | 8 | | 9 | 12–13 | 11 |
| 0 | | 1 | | 12–13 | 12 |
| | 10 | | 11 | 14–15 | 13 |
| 2 | | 3 | | 14–15 | 14 |
| | 12 | | 13 | 0–2 | 15 |
| 4 | | 5 | | 0–2 | 0 |
| | 14 | | 15 | 1–3 | 2 |
| 6 | | 7 | | 1–3 | 1 |
| | 0 | | 1 | 4–6 | 3 |
| 8 | | 9 | | 4–6 | 4 |
| | 2 | | 3 | 5–7 | 6 |
| 10 | | 11 | | 5–7 | 5 |
| | 4 | | 5 | 8–10 | 7 |
| 12 | | 13 | | 8–10 | 8 |
| | 6 | | 7 | 9–11 | 10 |
| 14 | | 15 | | 9–11 | 9 |
| | 8 | | 9 | 12–14 | 11 |

TABLE 2-continued

| Read 111 | Write 111 | Read 112 | Write 112 | Calculation | Finished |
|---|---|---|---|---|---|
| 0 |  | 1 |  | 12–14 | 12 |
|  | 10 |  | 11 | 13–15 | 14 |
| 4 |  | 5 |  | 13–15 | 13 |
|  | 12 |  | 13 | 0–4 | 15 |
| 2 |  | 3 |  | 0–4 | 0 |
|  | 14 |  | 15 | 1–5 | 4 |
| 6 |  | 7 |  | 1–5 | 1 |
|  | 0 |  | 1 | 2–6 | 5 |
| 8 |  | 9 |  | 2–6 | 2 |
|  | 4 |  | 5 | 3–7 | 6 |
| 12 |  | 13 |  | 3–7 | 3 |
|  | 2 |  | 3 | 8–12 | 7 |
| 10 |  | 11 |  | 8–12 | 8 |
|  | 6 |  | 7 | 9–13 | 12 |
| 14 |  | 15 |  | 9–13 | 9 |
|  | 8 |  | 9 | 10–14 | 13 |
| 0 |  | 1 |  | 10–14 | 10 |
|  | 12 |  | 13 | 11–15 | 14 |
| 8 |  | 9 |  | 11–15 | 11 |
|  | 10 |  | 11 | 0–8 | 15 |
| 2 |  | 3 |  | 0–8 | 0 |
|  | 14 |  | 15 | 1–9 | 8 |
| 10 |  | 11 |  | 1–9 | 1 |
|  | 0 |  | 1 | 2–10 | 9 |
| 4 |  | 5 |  | 2–10 | 2 |
|  | 8 |  | 9 | 3–11 | 10 |
| 12 |  | 13 |  | 3–11 | 3 |
|  | 2 |  | 3 | 4–12 | 11 |
| 6 |  | 7 |  | 4–12 | 4 |
|  | 10 |  | 11 | 5–13 | 12 |
| 14 |  | 15 |  | 5–13 | 5 |
|  | 4 |  | 5 | 6–14 | 13 |
|  |  |  |  | 6–14 | 6 |
|  | 12 |  | 13 | 7–15 | 14 |
|  |  |  |  | 7–15 | 7 |
|  | 6 |  | 7 |  | 15 |
|  | 14 |  | 15 |  |  |

Radix-2 DIF can be calculated in a similar manner, as evident from Table 3 below. C.f. FIG. 2a.

TABLE 3

| Read 111 | Write 111 | Read 112 | Write 112 | Calculation | Finished |
|---|---|---|---|---|---|
| 0 |  | 1 |  |  |  |
| 4 |  | 5 |  |  |  |
|  |  |  |  | 0–4 |  |
| 2 |  | 3 |  | 0–4 | 0 |
|  |  |  |  | 1–5 | 4 |
| 6 |  | 7 |  | 1–5 | 1 |
|  | 0 |  | 1 | 2–6 | 5 |
|  |  |  |  | 2–6 | 2 |
|  | 4 |  | 5 | 3–7 | 6 |
| 0 |  | 1 |  | 3–7 | 3 |
|  | 2 |  | 3 |  | 7 |
| 2 |  | 3 |  |  |  |
|  | 6 |  | 7 | 0–2 |  |
| 4 |  | 5 |  | 0–2 | 0 |
|  |  |  |  | 1–3 | 2 |
| 6 |  | 7 |  | 1–3 | 1 |
|  | 0 |  | 1 | 4–6 | 3 |
| 0 |  | 1 |  | 4–6 | 4 |
|  | 2 |  | 3 | 5–7 | 6 |
| 2 |  | 3 |  | 5–7 | 5 |
|  | 4 |  | 5 | 0–1 | 7 |
| 4 |  | 5 |  | 0–1 | 0 |
|  | 6 |  | 7 | 2–3 | 1 |
| 6 |  | 7 |  | 2–3 | 2 |
|  | 0 |  | 1 | 4–5 | 3 |
|  |  |  |  | 4–5 | 4 |
|  | 2 |  | 3 | 6–7 | 5 |
|  |  |  |  | 6–7 | 6 |
|  | 4 |  | 5 |  | 7 |
|  | 6 |  | 7 |  |  |

The method will, of course, even function for radix-4. Table 4 below shows the variant DIT. The problem of forced delays between the columns also disappears in this case with larger numbers of values. The Table obtained when N=64 is extremely long and is therefore not shown.

TABLE 4

| Read 111 | Write 111 | Read 112 | Write 112 | Calculation | Finished |
|---|---|---|---|---|---|
| 0 |  | 1 |  |  |  |
| 2 |  | 3 |  |  |  |
| 4 |  | 5 |  |  |  |
|  |  |  |  | 0-1-2-3 |  |
| 6 |  | 7 |  | 0-1-2-3 | 0 |
|  |  |  |  | 0-1-2-3 | 1 |
| 8 |  | 9 |  | 0-1-2-3 | 2 |
|  | 0 |  | 1 | 4-5-6-7 | 3 |
| 10 |  | 11 |  | 4-5-6-7 | 4 |
|  | 2 |  | 3 | 4-5-6-7 | 5 |
| 12 |  | 13 |  | 4-5-6-7 | 6 |
|  | 4 |  | 5 | 8-9-10-11 | 7 |
| 14 |  | 15 |  | 8-9-10-11 | 8 |
|  | 6 |  | 7 | 8-9-10-11 | 9 |
| 0 |  | 1 |  | 8-9-10-11 | 10 |
|  | 8 |  | 9 | 12-13-14-15 | 11 |
| 4 |  | 5 |  | 12-13-14-15 | 12 |
|  | 10 |  | 11 | 12-13-14-15 | 13 |
| 8 |  | 9 |  | 12-13-14-15 | 14 |
|  | 12 |  | 13 |  | 15 |
| 12 |  | 13 |  |  |  |
|  | 14 |  | 15 | 0-4-8-12 |  |
| 2 |  | 3 |  | 0-4-8-12 | 0 |
|  |  |  |  | 0-4-8-12 | 4 |
| 6 |  | 7 |  | 0-4-8-12 | 8 |
|  |  |  |  | 1-5-9-13 | 12 |
| 10 |  | 11 |  | 1-5-9-13 | 1 |
|  | 0 |  | 1 | 1-5-9-13 | 5 |
| 14 |  | 15 |  | 1-5-9-13 | 9 |
|  | 4 |  | 5 | 2-6-10-14 | 13 |
|  |  |  |  | 2-6-10-14 | 2 |
|  | 8 |  | 9 | 2-6-10-14 | 6 |
|  |  |  |  | 2-6-10-14 | 10 |
|  | 12 |  | 13 | 3-7-11-15 | 14 |
|  |  |  |  | 3-7-11-15 | 3 |
|  | 2 |  | 3 | 3-7-11-15 | 7 |
|  |  |  |  | 3-7-11-15 | 11 |
|  | 6 |  | 7 |  | 15 |
|  | 10 |  | 11 |  |  |
|  | 14 |  | 15 |  |  |

An alternative to reading from and writing into both memories simultaneously is to read from the first memory 111 and to write into the second memory 112 at one and the same time, or vice versa. One such example is shown in Table 5 below.

In this example, the odd values are stored in a first memory 112 and the even values in a second memory 111. A radix-4 DIF with N=16 is calculated.

TABLE 5

| Read 112 | Write 112 | Read 111 | Write 111 | Calculation | Finished |
|---|---|---|---|---|---|
| 0 |  |  |  |  |  |
| 4 |  |  |  |  |  |
| 8 |  |  |  |  |  |
| 12 |  |  |  |  |  |
|  |  | 1 |  |  |  |
|  |  | 5 |  |  |  |
|  |  | 9 |  |  |  |
|  |  | 13 |  |  |  |
| 2 |  |  |  | 0-4-8-12 |  |
| 6 |  |  |  | 0-4-8-12 | 0 |
| 10 |  |  |  | 0-4-8-12 | 4 |
| 14 |  |  |  | 0-4-8-12 | 8 |
|  |  | 0 |  | 1-5-9-13 | 12 |

TABLE 5-continued

| Read 112 | Write 112 | Read 111 | Write 111 | Calculation | Finished |
|---|---|---|---|---|---|
|  | 4 | 7 |  | 1-5-9-13 | 1 |
|  | 8 | 11 |  | 1-5-9-13 | 5 |
|  | 12 | 15 |  | 1-5-9-13 | 9 |
| 0 |  |  | 1 | 2-6-10-14 | 13 |
| 2 |  |  | 5 | 2-6-10-14 | 2 |
| 4 |  |  | 9 | 2-6-10-14 | 6 |
| 6 |  |  | 13 | 2-6-10-14 | 10 |
|  | 2 | 1 |  | 3-7-11-15 | 14 |
|  | 6 | 3 |  | 3-7-11-15 | 3 |
|  | 10 | 5 |  | 3-7-11-15 | 7 |
|  | 14 | 7 |  | 3-7-11-15 | 11 |
| 8 |  |  | 3 | 0-1-2-3 | 15 |
| 10 |  |  | 7 | 0-1-2-3 | 0 |
| 12 |  |  | 11 | 4-5-6-7 | 2 |
| 14 |  |  | 15 | 4-5-6-7 | 1 |
|  | 0 | 9 |  | 0-1-2-3 | 3 |
|  | 2 | 11 |  | 0-1-2-3 | 4 |
|  | 4 | 13 |  | 4-5-6-7 | 6 |
|  | 6 | 15 |  | 4-5-6-7 | 5 |
|  |  |  | 1 | 8-9-10-11 | 7 |
|  |  |  | 3 | 8-9-10-11 | 8 |
|  |  |  | 5 | 12-13-14-15 | 10 |
|  |  |  | 7 | 12-13-14-15 | 9 |
|  | 8 |  |  | 8-9-10-11 | 11 |
|  | 10 |  |  | 8-9-10-11 | 12 |
|  | 12 |  |  | 12-13-14-15 | 14 |
|  | 14 |  |  | 12-13-14-15 | 13 |
|  |  | 9 |  |  | 15 |
|  |  | 11 |  |  |  |
|  |  | 13 |  |  |  |
|  |  | 15 |  |  |  |

When proceeding as in Table 5, irrespective of the number of input values, the values intended for calculation of a column will consequently appear in one and the same memory, with the exception of the values intended for the last column, for which these latter input values are found uniformly distributed in both memories. The four values are read-in sequentially in Table 5, nevertheless. Alternatively, the penultimate column can be processed differently, by reading alternately from the first and second memories 111, 112. This is shown in Table 6, where a radix-4 DIF with N=64 is calculated. Only the first calculations have been printed, since the remainder of the calculations will be obvious to the person skilled in this art. Compare with FIG. 3*a* and FIG. 9.

TABLE 6

| Read 111 | Write 111 | Read 112 | Write 112 | Calculation | Finished |
|---|---|---|---|---|---|
| 0 |  |  |  |  |  |
| 16 |  |  |  |  |  |
| 32 |  |  |  |  |  |
| 48 |  |  |  |  |  |
|  | 1 |  |  |  |  |
|  | 17 |  |  |  |  |
|  | 33 |  |  |  |  |
|  | 49 |  |  |  |  |
| 2 |  |  |  | 0-16-32-48 |  |
| 18 |  |  |  | 0-16-32-48 | 0 |
| 34 |  |  |  | 0-16-32-48 | 16 |
| 50 |  |  |  | 0-16-32-48 | 32 |
|  | 0 | 3 |  | 1-17-33-49 | 48 |
|  | 16 | 19 |  | 1-17-33-49 | 1 |
|  | 32 | 35 |  | 1-17-33-49 | 17 |
|  | 48 | 51 |  | 1-17-33-49 | 33 |
| 4 |  |  | 1 | etc | 49 |
| 20 |  |  | 17 |  | etc |
| 36 |  |  | 33 |  |  |
| 52 |  |  | 49 |  |  |
|  | 2 | 5 |  |  |  |

TABLE 6-continued

| Read 111 | Write 111 | Read 112 | Write 112 | Calculation | Finished |
|---|---|---|---|---|---|
|  | 18 | 21 |  |  |  |
|  | 34 | 37 |  |  |  |
|  | 50 | 53 |  |  |  |
| 6 |  |  | 3 |  |  |
| 22 |  |  | 19 |  |  |
| 38 |  |  | 35 |  |  |
| 54 |  |  | 51 |  |  |
|  | 4 | 7 |  |  |  |
|  | 20 | 23 |  |  |  |
|  | 36 | 39 |  |  |  |
|  | 52 | 55 |  |  |  |
| 8 |  |  | 5 |  |  |
| 24 |  |  | 21 |  |  |
| 40 |  |  | 37 |  |  |
| 56 |  |  | 53 |  |  |
|  | 6 | 9 |  |  |  |
|  | 22 | 25 |  |  |  |
|  | 38 | 41 |  |  |  |
|  | 54 | 57 |  |  |  |
| 10 |  |  | 7 |  |  |
| 26 |  |  | 23 |  |  |
| 42 |  |  | 39 |  |  |
| 58 |  |  | 55 |  |  |
|  | 8 | 11 |  |  |  |
|  | 24 | 27 |  |  |  |
|  | 40 | 43 |  |  |  |
|  | 56 | 59 |  |  |  |
| 12 |  |  | 9 |  |  |
| 28 |  |  | 25 |  |  |
| 44 |  |  | 41 |  |  |
| 60 |  |  | 57 |  |  |
|  | 10 | 13 |  |  |  |
|  | 26 | 29 |  |  |  |
|  | 42 | 45 |  |  |  |
|  | 58 | 61 |  |  |  |
| 14 |  |  | 11 |  |  |
| 30 |  |  | 27 |  |  |
| 46 |  |  | 43 |  |  |
| 62 |  |  | 59 |  |  |
|  | 12 | 15 |  |  |  |
|  | 28 | 31 |  |  |  |
|  | 44 | 47 |  |  |  |
|  | 60 | 63 |  |  |  |
| 0 |  |  | 13 |  |  |
| 4 |  |  | 29 |  |  |
| 8 |  |  | 45 |  |  |
| 12 |  |  | 61 |  |  |
|  | 14 | 1 |  |  |  |
|  | 30 | 5 |  |  |  |
|  | 46 | 9 |  |  |  |
|  | 62 | 13 |  |  |  |
| 2 |  |  | 15 |  |  |
| 6 |  |  | 31 |  |  |
| 10 |  |  | 47 |  |  |
| 14 |  |  | 63 |  |  |
|  | 0 | 3 |  |  |  |
|  | 4 | 7 |  |  |  |
|  | 8 | 11 |  |  |  |
|  | 12 | 15 |  |  |  |
| 16 |  |  | 1 |  |  |
| 20 |  |  | 5 |  |  |
| 24 |  |  | 9 |  |  |
| 28 |  |  | 13 |  |  |
|  | 2 | 17 |  |  |  |
|  | 6 | 21 |  |  |  |
|  | 10 | 25 |  |  |  |
|  | 14 | 29 |  |  |  |
| 18 |  |  | 3 |  |  |
| 22 |  |  | 7 |  |  |
| 26 |  |  | 11 |  |  |
| 30 |  |  | 15 |  |  |
|  | 16 | 19 |  |  |  |
|  | 20 | 23 |  |  |  |
|  | 24 | 27 |  |  |  |
|  | 28 | 31 |  |  |  |
| 32 |  |  | 17 |  |  |
| 36 |  |  | 21 |  |  |

TABLE 6-continued

| Read 111 | Write 111 | Read 112 | Write 112 | Calculation | Finished |
|---|---|---|---|---|---|
| 40 | | | 25 | | |
| 44 | | | 29 | | |
| | 18 | 33 | | | |
| | 22 | 37 | | | |
| | 26 | 41 | | | |
| | 30 | 45 | | | |
| 34 | | | 19 | | |
| 38 | | | 23 | | |
| 42 | | | 27 | | |
| 46 | | | 31 | | |
| | 32 | 35 | | | |
| | 38 | 39 | | | |
| | 40 | 43 | | | |
| | 44 | 47 | | | |
| 48 | | | 33 | | |
| 52 | | | 37 | | |
| 56 | | | 41 | | |
| 60 | | | 45 | | |
| | 34 | 49 | | | |
| | 38 | 53 | | | |
| | 42 | 57 | | | |
| | 46 | 61 | | | |
| 50 | | | 35 | | |
| 54 | | | 39 | | |
| 58 | | | 43 | | |
| 62 | | | 47 | | |
| | 48 | 51 | | | |
| | 52 | 55 | | | |
| | 56 | 59 | | | |
| | 60 | 63 | | | |
| | | 49 | | 50-54-58-62 | |
| | | 53 | | 50-54-58-62 | 50 |
| | | 57 | | 50-54-58-62 | 54 |
| | | 61 | | 50-54-58-62 | 58 |
| | 50 | | | 51-55-59-63 | 62 |
| | 54 | | | 51-55-59-63 | 51 |
| | 58 | | | 51-55-59-63 | 55 |
| | 62 | | | 51-55-59-63 | 59 |
| | | 51 | | | 63 |
| | | 55 | | | |
| | | 59 | | | |
| 0 | | 63 | | | |
| | | | 1 | | |
| 2 | | | | | |
| | | | 3 | | |
| 4 | | | | 0-1-2-3 | |
| | | | 5 | 0-1-2-3 | 0 |
| 6 | | | | 0-1-2-3 | 1 |
| | | | 7 | 0-1-2-3 | 2 |
| 8 | | | | etc | 3 |
| | | | 9 | | etc |
| 10 | | | | | |
| | 0 | 11 | | | |
| 12 | | | 1 | | |
| | 2 | 13 | | | |
| 14 | | | 3 | | |
| | 4 | 15 | | | |
| 16 | | | 5 | | |
| | 6 | 17 | | | |
| 18 | | | 7 | | |
| | 8 | 19 | | | |
| 20 | | | 9 | | |
| | 10 | 21 | | | |
| 22 | | | 11 | | |
| | 12 | 23 | | | |
| 24 | | | 13 | | |
| | 14 | 25 | | | |
| 26 | | | 15 | | |
| | 16 | 27 | | | |
| 28 | | | 17 | | |
| | 18 | 29 | | | |
| 30 | | | 19 | | |
| | 20 | 31 | | | |
| 32 | | | 21 | | |
| | 22 | 33 | | | |
| 34 | | | 23 | | |
| | 24 | 35 | | | |
| 36 | | | 25 | | |
| | 26 | 37 | | | |
| 38 | | | 27 | | |
| | 28 | 39 | | | |
| 40 | | | 29 | | |
| | 30 | 41 | | | |
| 42 | | | 31 | | |
| | 32 | 43 | | | |
| 44 | | | 33 | | |
| | 34 | 45 | | | |
| 46 | | | 35 | | |
| | 36 | 47 | | | |
| 48 | | | 37 | | |
| | 38 | 49 | | | |
| 50 | | | 39 | | |
| | 40 | 51 | | | |
| 52 | | | 41 | | |
| | 42 | 53 | | | |
| 54 | | | 43 | | |
| | 44 | 55 | | | |
| 56 | | | 45 | | |
| | 46 | 57 | | | |
| 58 | | | 47 | | |
| | 48 | 59 | | | |
| 60 | | | 49 | | |
| | 50 | 61 | | | |
| 62 | | | 51 | | |
| | 52 | 63 | | | |
| | | | 53 | | |
| | | | 55 | | |
| | | | 57 | | |
| | | | 59 | | |
| | | | 61 | | |
| | | | 63 | | |

Figure 5:
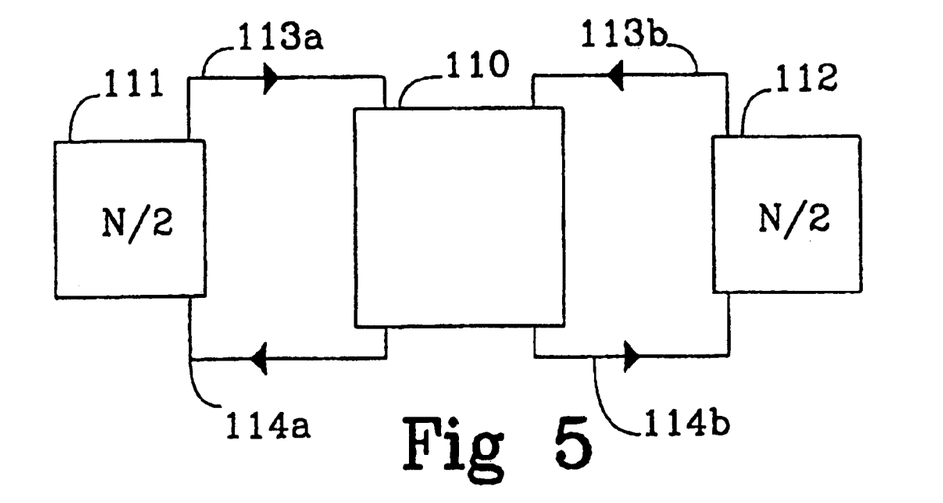
FIG. 5 is a block schematic illustrating one embodiment of the invention.

FIG. 5 illustrates a method of implementing the invention. In distinction to FIGS. 4a and 4b, FIG. 5 shall be interpreted in a more concrete manner. A calculating unit 110 is connected to a first memory 111 and to a second memory 112 by means of two write busses 114a and 114b, and two read busses 113a and 113b. Half of the values are stored in memory positions in the first memory 111 and half in memory positions in the second memory 112. This enables reading and writing to be effected simultaneously in both memories 111 and 112. It will be noted that only half of the memory space in the two memories 111 and 112 is required, in comparison with FIGS. 4a and 4b.

Figure 6:
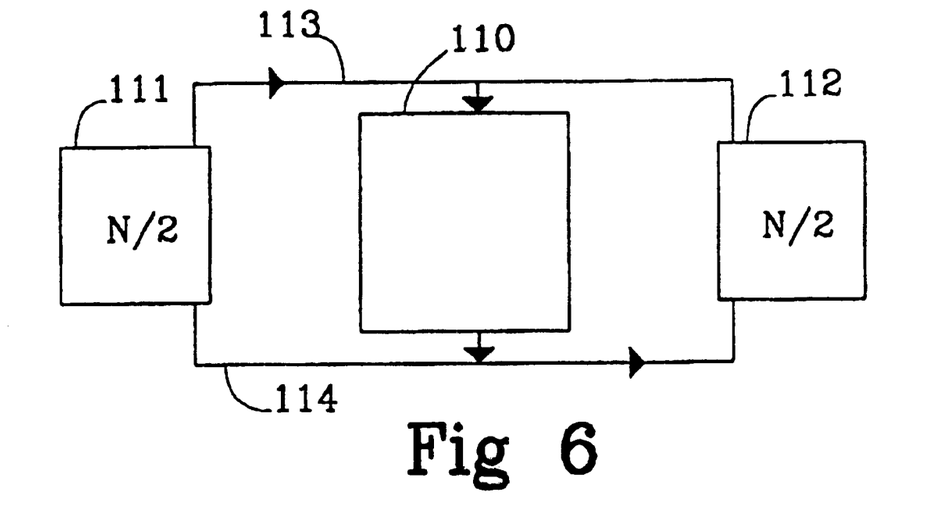
FIG. 6 is a block schematic illustrating another embodiment of the invention.

FIG. 6 shows another embodiment of the invention. A calculating unit 110 is connected to a first memory 111 and to a second memory 112 by means of a common write bus 114 and a common read bus 113. In this case, the calculating unit 110 writes to the second memory 112 at the same time as it reads from the first memory 111. One common write bus 114 and one common read bus 113 will therefore suffice to this end. The Figure is similar to FIG. 5 in other respects.

It is conceivable to extend both FIGS. 5 and 6 to include more memories.

Figure 7:
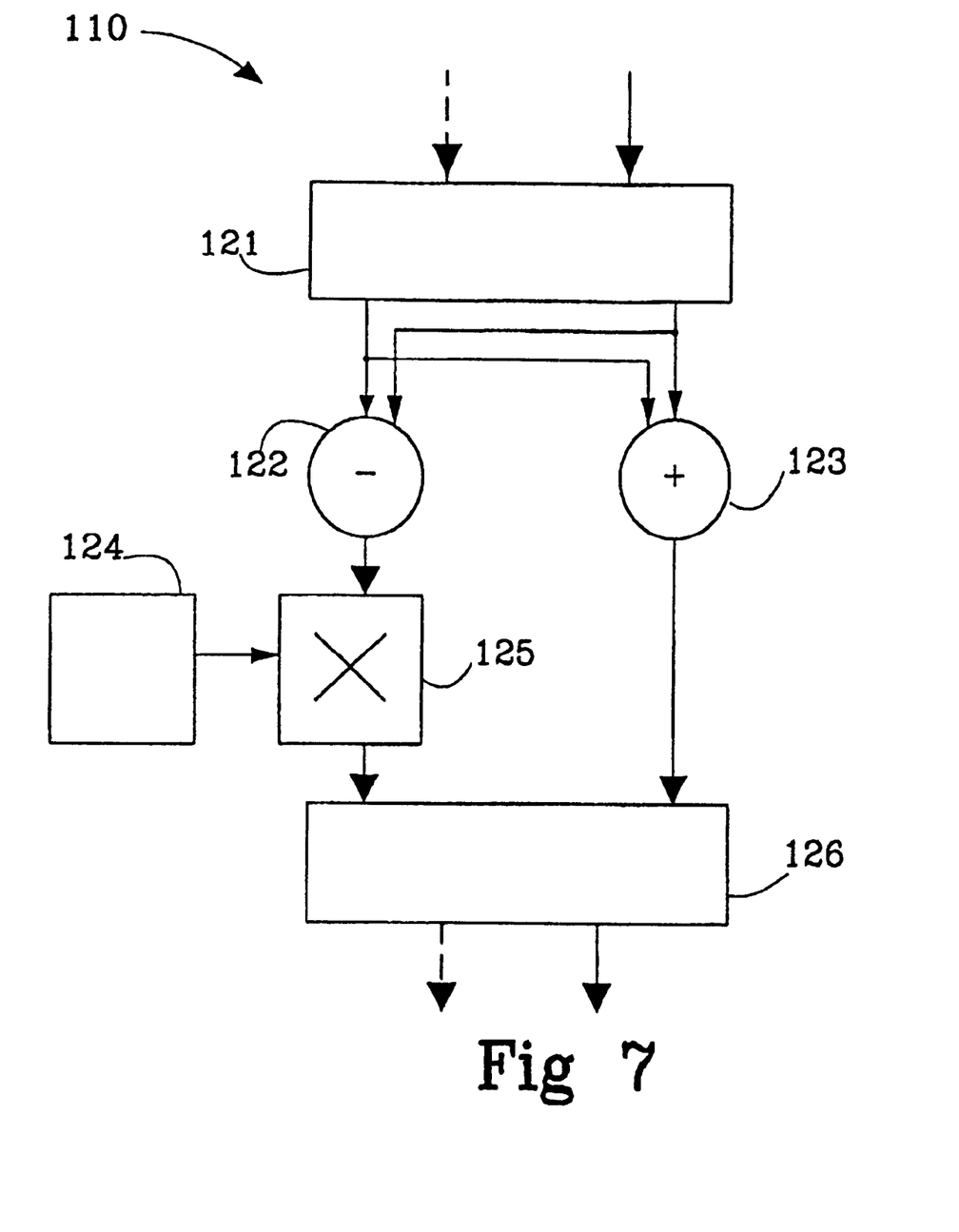
FIG. 7 is a block schematic illustrating one embodiment of the calculating unit in FIG. 5 or in FIG. 6.

FIG. 7 is a block schematic that illustrates a conceivable design of the calculating unit in FIG. 5 and in FIG. 6 in the case of radix-2 DIF. Both of the two input values pass to a subtractor 122 and to an adder 123. The value delivered by the substractor 122 is multiplied in a complex multiplier 125 by a weight coefficient delivered from a weight coefficient memory 124.

Depending on how the algorithm is implemented, c.f. the above Tables, a few registers are also required for the intermediate storage of the input values and the output values respectively, so that two butterfly calculations can be commenced simultaneously. The number of registers required will depend on the number of clock cycles needed between reading and calculating and between calculating and writing. The registers shown in FIG. 7 are illustrated purely schematically as an intermediate storage device 121 into which input values are entered, and an intermediate storage device 126 from which the output values are delivered. It is not necessary to always store both incoming and outgoing values.

Figure 8A:
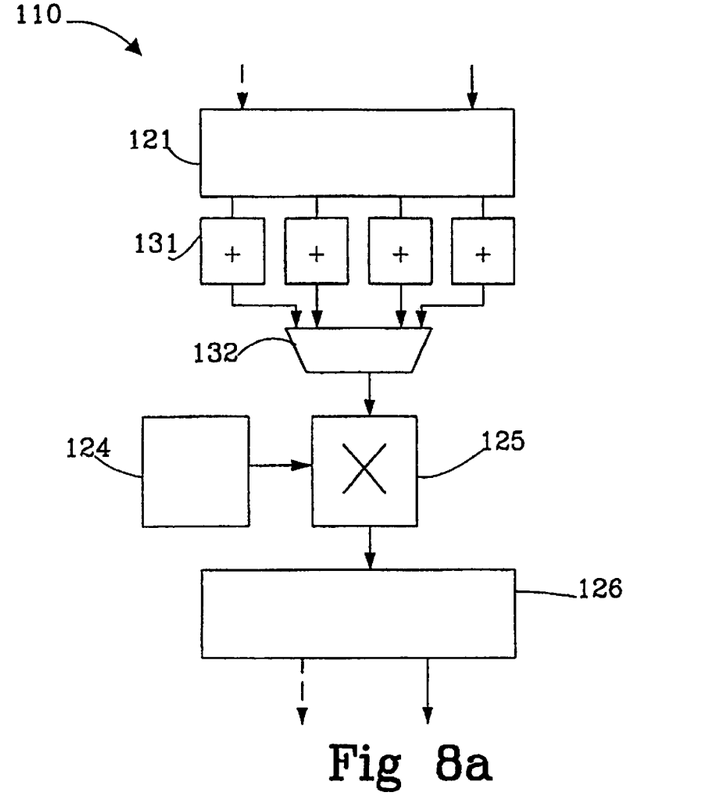
FIG. 8a is a block schematic illustrating another embodiment of the calculating unit in FIG. 5 or in FIG. 6.

FIG. 8a is a block schematic illustrating a conceivable design of the calculating unit 110 in FIG. 5 or in FIG. 6 in the case radix-4 DIF. The four input values required are delivered to four summation units 131, whereafter the four summated values are delivered singly from the summation units 131, via a multiplexor 132, to a complex multiplier 125, where the summated values are multiplied by corresponding weight coefficients from a weight coefficient memory 124 prior to being resent to the memories.

Similar to the FIG. 7 embodiment, certain intermediate storage is required, this being illustrated schematically in the form of two intermediate storage devices 121 and 126.

Figure 8B:
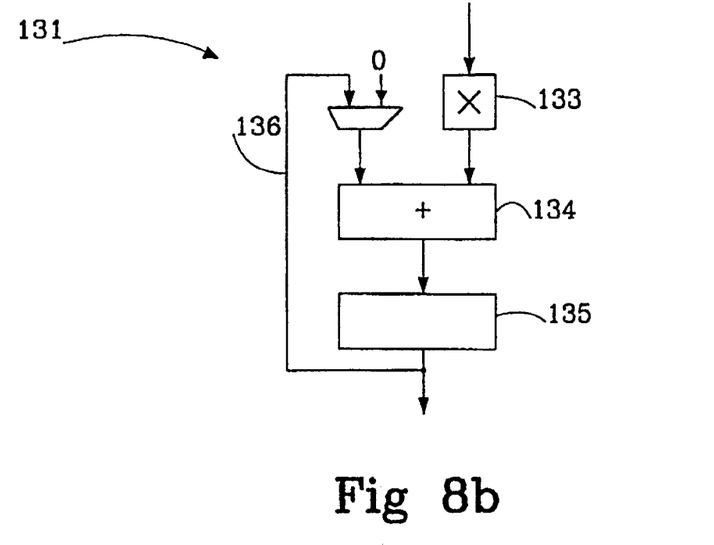

FIG. 8b is a detailed illustration of a design of a summation unit 131. The summation unit 131 includes a multiplier 133, an adder 134, a summation register 135 and a multiplexor 136.

The first input value is multiplied in the multiplier 133 by 1, −1, i or −i depending on which of the values in the butterfly shall be calculated. No conventional advanced multiplier is required for such an operation, since all that is required is a change of sign or a change of place. The result obtained in the multiplier 133 is delivered to the adder 134.

The multiplexor 136 chooses what the adder 134 shall add to the summation register 135. On the first occasion, the value 0 is added to the result from the multiplier 133 and placed in the summation register 135. On the remaining three occasions, the value is instead placed in the summation register 135 together with the result from the multiplier 133.

Figure 9:
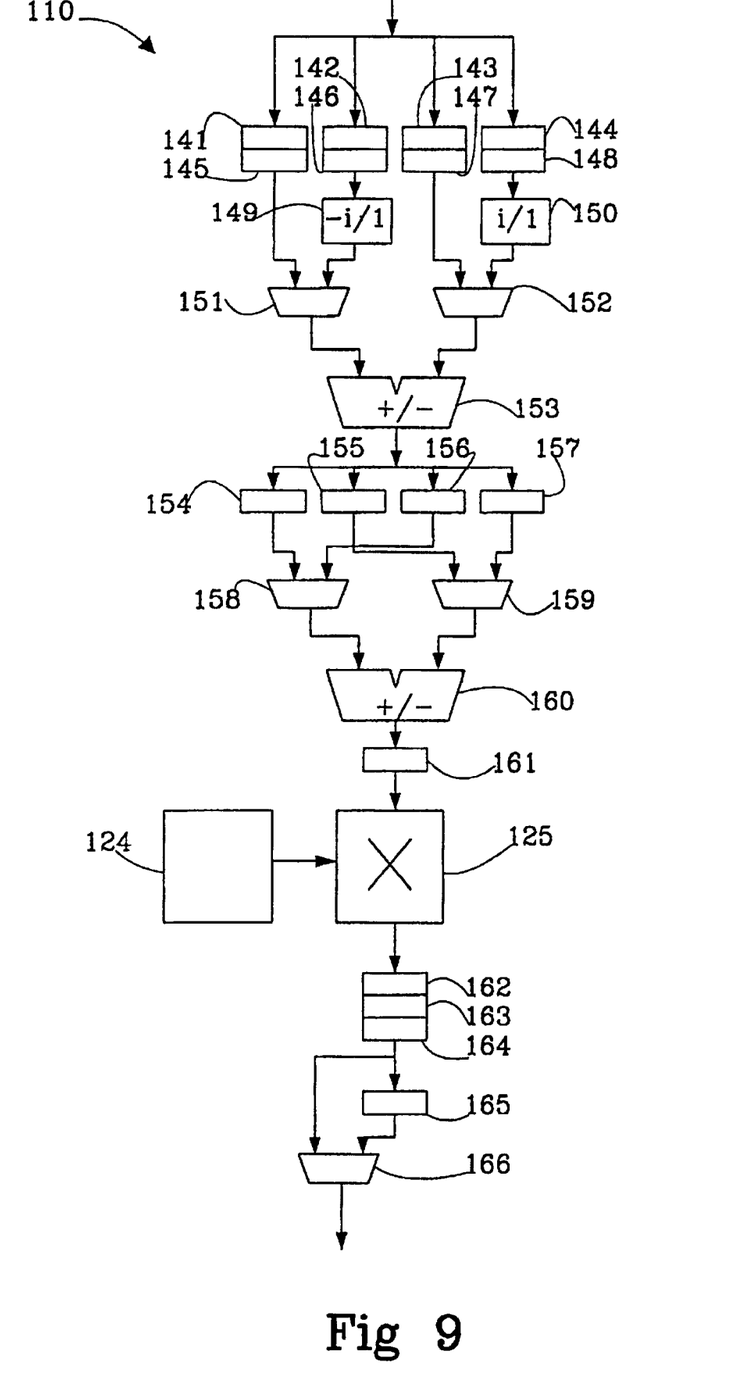
FIG. 9 is a block schematic illustrating a further embodiment of the calculating unit in FIG. 5 or in FIG. 6.

FIG. 9 shows a more concrete example of the register layout. This Figure illustrates implementation of Table 6 with the aid of a calculating unit 110. It will be noted that each row in the Table corresponds to a clock cycle, but that the presentation of the calculation in the Table is simplified. In FIG. 9, a value can be moved from one register to another during a clock cycle, with possible intermediate calculations, or may remain in the same register.

On the first occasion, the values 0, 16, 32 and 64 are read-in one at a time and placed in four first registers 141, 142, 143, 144. The values 0, 16, 32 and 64 are then moved to four second registers 145, 146, 147, 148, while new values 1, 17, 33 and 49 are read-in one at a time and placed in said four registers 141, 142, 143, 144.

In this case, the calculating unit 110 utilizes the fact that the same additions reoccur. The intermediate result is therefore stored intermediately in four intermediate storage registers 154, 155, 156, 157. The values from respective registers 146 and 150 are multiplied by one of the values 1 or −i or by 1 or i in two simple multipliers 149 and 150. That is to say, the multiplication by 1 is the same as no multiplication at all, and the multiplication by i or −i is merely a question of a place change and sign change, if any, in the data word of the value.

The addition and subtraction is performed with the aid of two multiplexors 151 and 152 and an adder-subtractor 153, wherewith the values in the intermediate storage registers 154, 155, 156 and 157 will be 0+32; 0−32; 16+64; −16i+64i respectively. During this time period, the values 1, 17, 33, 49 in the first registers 141, 142, 143 and 144 are transferred to the second registers 145, 146, 147 and 148, while new values 2, 18, 34, 50 are read into the first register 141, 142, 143, 144. All these values will later be processed analogously with the first values 0, 16, 32 and 64.

The values in the intermediate storage registers 154, 155, 156 and 157 are now added to and subtracted from each other through the medium of two further multiplexors 158 and 159 and a further adder-substractor 161, and are stored intermediately in a register 161. The value in the register 161 will then assume the values 0+16+32+64; 0−16i−32+64i; 0−16+32−64 and 0+16i−32−64i respectively.

The value currently in register 161 will then be multiplied in a complex multiplier 125 by a weight coefficient taken from a weight coefficient memory 124. This weight coefficient is different for the different calculations.

The resulting output values can then be written one at a time via terminating intermediate storage registers 162, 163, 164 and 165, and a terminating multiplexor 166.

Calculating units for radix-2 and radix-4 DIT may, of course, be obtained in a similar way, although with multiplication by weight coefficients prior to addition and subtraction. FFT algorithms having higher radix numbers can also be implemented in a similar way.

Other alternatives may, for instance, be based on the use of more than two memories. The complex multiplier will then likely become a bottleneck. The use of a "double" calculating unit with two complex multipliers is a conceivable solution in this latter regard.

The person skilled in this art will realize that the concept described above with regard to FFT can also be applied in the calculation of inverse FFT and like transforms.

What is claimed is:

1. A method of calculating FFT, IFFT or like transforms with the aid of a calculating unit and at least two memories, said calculating unit reading input values from memory positions in the memories, performing one or more calculations that require at least two input values and writing the output values resulting from said calculations into corresponding memory positions in the memories, wherein at least two groups of calculations may be commenced simultaneously by virtue of the following method steps:

reading the input values for calculation in different groups of calculation into the calculating unit and storing said input values in at least one first intermediate storage device;

determining when all input values necessary for a current group of current calculations have been read into the calculating unit;

determining when the calculations in a preceding group of calculations have terminated at least one first calculation step;

commencing the calculations in the current group of calculations when all input values necessary for the current calculation group have been read into the calculating unit and the calculations in the preceding group of calculations have terminated at least one first calculation step;

determining when the output values from the preceding group of calculations have been written;

storing the output values from the current group of calculations in at least one intermediate storage device until the output values from the preceding group of calculations have been written; and writing the output values from one group of calculations back to the same memory positions as those from which the input values were read, whereafter the output values can function as new input values.

2. A method according to claim 1, wherein the calculating unit writes the output values into memory positions in at least two different memories at the same time or to read the input values from memory positions in at least two different memories at the same time.

3. A method according to claim 1, wherein the calculating unit writes at least one output value into at least one memory position in at least one memory, at the same time as it reads at least one input value from at least one memory position in at least one memory.

4. A method of calculating FFT, IFFT or like transforms with the aid of a calculating unit and at least two memories, wherein said calculating unit reads input values from memory positions in the memories, performs one or more calculations that require at least two input values, and writes the output values resulting from said calculations into corresponding memory positions in the memories, wherein at least two groups of calculations may be commenced simultaneously by virtue of the following method steps:

connecting the calculating unit to at least one memory position in a first memory and to at least one memory position in said first or in a second memory for reading the input values;

storing the read-in input values intermediately in at least one first intermediate storage device;

determining when all input values necessary for a current group of current calculations have been read into the calculating unit;

determining when the calculations in a preceding group of calculations have terminated at least one first calculation step;

commencing the calculations in the current group of calculations when all input values necessary for said current group of calculations have been read into the calculating unit and the calculations in the preceding group of calculations have terminated at least one first calculation step;

determining when the output values from the preceding group of calculations have been written;

storing the output values from said current group of calculations intermediately in at least one intermediate storage device until the output values from the preceding group of calculations have been written;

connecting the calculating unit to the same memory positions as those from which the input values for said current group of calculations was read; and     writing the output values from the current group of calculations info these same memory positions, whereafter the output values can function as new input values.

5. A calculating unit for calculating FFT, IFFT or like transforms comprising at least two memories and a calculating unit adapted to read input values from memory positions in the memories, performing in at least one calculating step a group of calculations with said input values and writing the output values resulting from said calculations into corresponding memory positions in the memories, and wherein:

the calculating unit also includes at least one first intermediate storage device and one second intermediate storage device;

the calculating unit is adapted to store read input values intermediately in the first intermediate storage device until all input values necessary for a current group of calculations have been read into the calculating unit and the calculations in a preceding group of calculations has terminated at least one first calculation step, wherewith the calculations in said current group of calculations are commenced with the first calculation step;

the calculating unit is adapted to store intermediately calculated output values from said current group of calculations in the second intermediate storage device until the output values from the preceding group of calculations have been written; and     the calculating unit is also adapted to write the output values from a group of calculations into the same memory positions as those from which the input values were read, whereafter the output values can function as new input values.

6. A calculating unit according to claim 5, wherein the calculating unit includes at least two read busses and at least two write busses between the calculating unit and the memories; and in that the calculating unit is adapted to write the output value into or read the input values from memory positions in at least two memories simultaneously.

7. A calculating unit according to claim 5, wherein the calculating unit includes at least one read bus and at least one write bus between the calculating unit and the memories; and in that the calculating unit is adapted to write at least one output value into at least one memory position in at least one memory, and, at the same time, to read at least one input value from at least one memory position in at least one other memory.

8. A calculating unit according to claim 5, wherein the calculating unit also includes a subtractor, an adder, a complex multiplier, and a weight coefficient memory.

9. A calculating unit according to claim 5, wherein the calculating unit also includes four summation units, a multiplexor, a complex multiplier, and a weight coefficient memory.

10. A calculating unit according to claim 9, wherein a summation unit includes an adder, a register, and means for multiplying an incoming value by 1, −1, i or −i.

11. A calculating unit according to claim 5, wherein the calculating unit also includes at least two simple multipliers, at least four multiplexors, two adders-subtractors, a complex multiplier and a weight coefficient memory.

12. A calculating unit according to claim 5, wherein the intermediate storage devices are registers.

13. A calculating unit according to claim 5, wherein each memory includes essentially the same number of values.

14. A calculating unit for calculating FFT, IFFT or like transforms, comprising at least two memories, and one calculating unit which is adapted to read input values from memory positions in the memories, perform in at least one calculating step a group of calculations with said input values and write the output values resulting from said calculations into corresponding memory positions in the memories, wherein:

the calculating unit also includes at least one first intermediate storage device and one second intermediate storage device;

the calculating unit is adapted for connection to at least one memory position in a first memo and to at least one memory position in said first or in a second memory for reading the input values;

the calculating unit is adapted to store intermediately read input values in the first intermediate storage device until all input values necessary for a current group of calculations have been read into said calculating unit and the calculations in a preceding group of calculations have terminated at least one first calculation step, wherewith the calculations in said current group of calculations are commenced with said first calculation step;

the calculating unit is adapted to store calculated output values from the current group of calculations intermediately in said second intermediate storage device until the output values from the preceding group of calculations have been written;

the calculating unit is adapted to be connected to the same memory positions as those from which the input values of said current group of calculations was read; and the calculating unit is adapted to write the output values from a group of calculations back into the same memory positions as those from which the input values were read, whereafter the output values can function as new input values.

* * * * *